Patented July 30, 1935

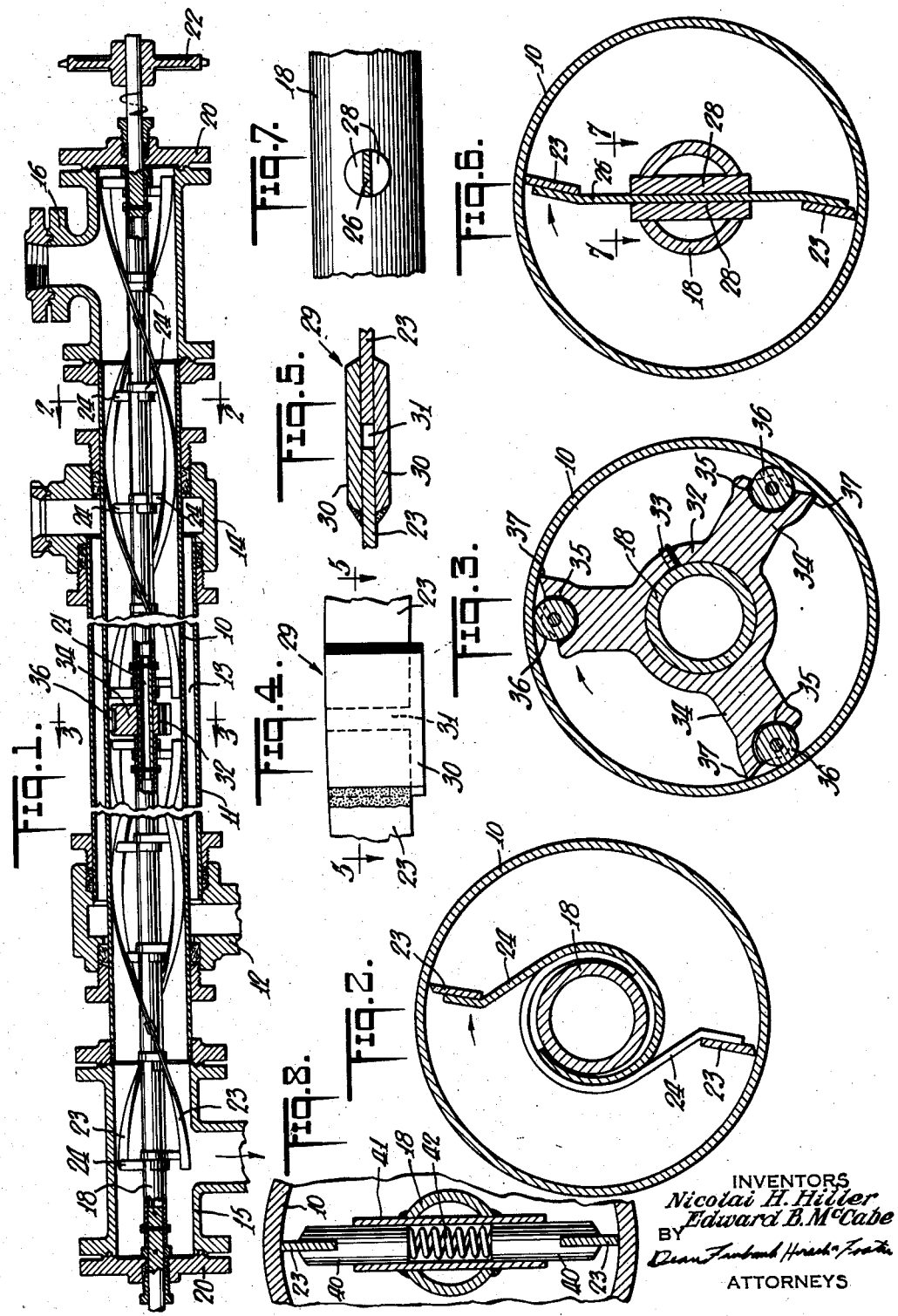

2,009,734

UNITED STATES PATENT OFFICE 2,009,734

CHILLING APPARATUS

Nicolai H. Hiller and Edward B. McCabe, Carbondale, Pa., assignors, by mesne assignments, to Worthington Pump and Machinery Corporation, Harrison, N. J., a corporation of Virginia Application February 3, 1934, Serial No. 709,587

12 Claims. (Cl. 259—9)

The present invention relates to apparatus of the general type shown in the Torrance U. S. Patent No. 1,796,772 for treating liquids to effect the congealation or separation of solid constituents therefrom. In such an apparatus, the separation of the solid constituents is effected for example by chilling a distillate to separate paraffine, waxes or the like, the chilling being most effectively secured by delivering the liquid and a chilling agent in heat interchanging relationship. The paraffine or other solid matter separates out and tends to collect on the walls of the liquid carrying passages.

In the construction illustrated in said patent, the helical conveyer for scraping and advancing the separated solids is of the type in which a ribbon-like helical blade is supported on a central shaft, and has its inner periphery spaced from the shaft to form a passageway along said shaft for the delivery of the liquid to be treated therethrough.

A scraper for removing the solid matter from the wall is effective so long as its scraping edge contacts or substantially contacts with the inner cylindrical surface of the passage. However, it is difficult to machine a helical conveyer so that all parts of its outer periphery follow a true cylindrical path. Even if the helical conveyer be accurately machined or formed, wear of the scraping edge or of the inner wall surface of the passage in which the conveyer operates, often leaves more or less of the surface unscraped and a thin layer of solids will remain. This decreases the heat transmission through the wall. Furthermore, the conveyer is very apt to become permanently distorted through continuous use, since it is usually made of very thin material and is subjected to stresses in its action on the solids and liquids.

One object of the present invention is to provide a helical conveyer which insures the continuous contact of its peripheral scraping edge with the inner surface of a substantially cylindrical passage without the necessity of extreme, accurate machining.

We accomplish this object by so supporting the helical ribbon or blade upon the shaft as to cause it to yieldably engage the surface on which the solids tend to collect.

By resiliently mounting the blade on the shaft, said blade will resiliently yield circumferentially with respect to the conveyer shaft, whereby permanent distortion of the blade is minimized.

As a feature of the present invention, the helical conveyer of the ribbon type is made up of a plurality of sections loosely connected together to permit slight movement therebetween so that the sections will be transversely resilient. By means of this construction, the sections will be free to straighten out axially as they engage any irregularity in the wall surface causing a decrease in the diameter of the ribbon conveyer.

As a further object of the present invention, there is provided new and improved means for supporting the intermediate section of the conveyer shaft between its end journals. Since the conveyer shafts in apparatus of the type referred to are comparatively long, the intermediate portions have a tendency to sag. Our improved supporting device is fixed to the shaft and carries anti-friction rolling elements on the radially outer portion thereof for engagement with the inner surface of the tubular member in which the conveyer operates, so that the shaft is amply supported against sagging, and is free to rotate with a minimum amount of frictional resistance. Furthermore, the radially outer portions of these supporting devices are provided with scraping edges to remove accumulation of solids from the surface in advance of the rollers and thus prevent injury or stalling which might result from the roller engaging hard lumps not easy to crush or flatten out.

In the accompanying drawing, there are shown for the purpose of illustration, certain embodiments of our invention. In the drawing:

Fig. 1 is a longitudinal section of a portion of a countercurrent heat interchanger, and shows one form of helical conveyer therefor.

Figs. 2 and 3 are sections taken on the lines 2—2 and 3—3 respectively of Fig. 1, but on a larger scale.

Fig. 4 is a side view showing the connection between adjoining blade sections.

Fig. 5 is a section taken on the line 5—5 of Fig. 4.

Fig. 6 is a section showing another form of yieldable support for the ribbon conveyer.

Fig. 7 is a section taken on the line 7—7 of Fig. 6, and

Fig. 8 is a section showing another form of yieldable support for the ribbon conveyer.

The invention is illustrated in conjunction with a distillate chilling apparatus of the general type shown in the Torrance Patent No. 1,796,772. However, as far as the broad aspects of the invention are concerned, the improved helical conveyer may be used in any construction in which it is desired to scrape solids from the inner surface of a tubular member or advance them along said member.

In the drawing, there is shown a pair of concentric pipes. The inner pipe 10 serves to conduct distillate or other liquid to be cooled, and the outer pipe 11 forms with said inner pipe an annular chamber 13 for conducting the cooling medium, which may enter and leave through headers 12 and 14 near its ends. The inner pipe 10 projects through stuffing boxes in the headers, and is secured to headers or couplings 15 and 16 for the admission and exit of the liquid to be chilled.

The conveyer shaft 18 which is preferably hollow has rod extensions suitably journaled in end walls 20 of the headers 15 and 16, and may comprise two or more sections connected by an internal rod section 21 secured by pins to the ends of the sections. The shaft 18 is driven by any suitable means, as for instance by a chain engaging a sprocket wheel 22 carried by said shaft, and carries a conveyer in the form of a comparatively narrow helical blade or ribbon 23 of such external diameter that it substantially engages the inner surface of the pipe 10, and of such width that it acts to advance towards the outlet header 15 the solid mterial which is scraped off the inner pipe 10. The blade 23 is spaced from the shaft to such a distance as to leave a substantially free and uninterrupted passage along the shaft and between the latter and the inner circumference of said blade.

As an important feature of the invention, means are provided for resiliently supporting the ribbon 23 from the shaft 18. In the specific form shown in Figs. 1 and 2, said means includes a plurality of spring arms 24 welded or otherwise connected at their inner ends to the shaft 18 and curved near said ends to partially encircle the shaft. The outer ends of the arms 24 extend outwardly towards the inner surface of the pipe 10, and are welded or otherwise connected to the helical blade 23 in such a manner that a portion of the radially outer end of the blade extends beyond the corresponding ends of the arms 24. The radially outer end of the blade 23 may be beveled as shown to increase its effectiveness as a scraper.

The arms 24 are of spring metal, so that the curved portions thereof have a tendency to straighten out. Since the inner ends of these arms are fixed to the shaft 18, the outer ends thereof tend to swing in a clockwise direction (as shown in Fig. 2) along arcs having radii greater than that of the inner surface of the pipe 10. The scraping edge of the blade 23 will therefore be yieldably urged into contact with the inner surface of the pipe 10 and in the same direction as the direction of rotation of the shaft 18.

If any irregularity or hard lump on the inner surface of the pipe 10 comes into contact with the helical blade 23, the blade will be pressed radially inwardly and rearwardly. The resiliency of the arms supporting the scraping edge of the blade will return the edge to its former position in contact with the inner surface of the pipe 10 as the irregularity or lump is passed, and without subjecting said blade to any stress which would permanently distort it. The inward movement is due to the fact that the arms 24 will tend to wind themselves around the shaft 18 and yield in a counterclockwise direction (as shown in Fig. 2) against the action of their inherent resiliency.

In order to permit of the resiliency of the helical blade 23, said blade is made of sections, each of which does not extend along more than one-half of the circumference of the wall. If the pipe 10 be six inches in diameter and the blade 23 makes a complete turn in approximately every four foot length, two blades may be used at opposite sides of the shaft and the arms 24 for each blade may be spaced about nine inches apart.

In Fig. 6 is shown another form of resilient mounting for the helical blade or ribbon. In this construction, there are provided spring arms 26 extending substantially radially of the inner pipe 10 and fixed thereto. The radially outer ends of the arms 26 carry the blade 23 in a manner similar to that already described with reference to the arms 24. In the case where two helical blades 23 are used as above referred to, each spring arm 26 extends diametrically through the conveyer shaft 18 and connects diametrically opposite sections of the two blades 23 together as shown, so that the two blades may resiliently yield rearwardly and inwardly.

In order to fix the arms 26 to the conveyer shaft 18, said shaft, in the specific form shown, has holes extending diametrically thereof, and supporting plugs 28 through which said arms extend with a press-fit. The plugs 28 may be permanently secured in place by welding them to the hollow shaft.

As an important feature of the present invention, means are provided for connecting the sections of the blade together so as to permit relative movement lengthwise and radially of the blades. Said means is shown as couplings 29 (Figs. 4 and 5) each comprising a pair of plate members 30 welded along one edge thereof to the end of one blade section, and forming therebetween a slot 31 in which is loosely fitted the end of the adjoining ribbon section. This latter end is slipped between the two plates 30 and in normal position is spaced from the end of the other adjoining blade section fixed to the plate members 30. Thus, the sections of the helical blade are free to yieldably move not only circumferentially with respect to the conveyer shaft, but also to move radially inwardly, any straightening of the blade section resulting from such movement being taken care of by the loose coupling between adjoining sections.

Various other types of resilient means may be provided for supporting the blade on said shaft. For instance, there may be provided radially movable arms 40 mounted to reciprocate in said shaft or in sockets 41 welded or otherwise connected thereon, and having coil springs 42 for pushing the arms outwardly as shown in Fig. 8.

As another feature of the present invention, the intermediate portion of the conveyer shaft 18 is supported from the inner pipe 10 by means of a supporting or bearing member shown in Fig. 3. This member has a sleeve portion 32 firmly engaging the outer periphery of the shaft 18, and is secured thereto by any suitable means, as for instance set screws 33. Extending radially from this cylindrical sleeve portion 32 is a plurality of arms 34, three of such arms being shown spaced 120° apart. The radially outer ends of these arms are provided with grooves 35 for receiving rollers 36 mounted on pintles and adapted to engage the inner surface of the inner pipe 10.

In order to prevent the accumulation of solid in the inner periphery of the inner pipe 10 in the path of the rollers, the outer ends of the arms 34 are provided with scraping edges 37 in contact with the inner surface of the pipe 10. A the conveyer shaft 18 rotates, the supporting member rotates therewith, the anti-friction rolling elements 36 between the supporting member and the inner pipe 10 permitting this to be done with a minimum amount of frictional resistance. As this supporting member rotates, the scraping edges 37 remove the accumulated solids from the inner wall of the pipe 10.

Having thus described our invention, what we claim as new and desire to secure by Letters Patent is:—

1. In combination, a conduit, and a helical conveyer for removing material from the inner surface of said conduit, and including a shaft, a helical blade encircling said shaft, and having its inner periphery spaced from said shaft to leave an annular passageway along said shaft, and means for supporting said helical blade on said shaft and yieldingly resisting movement of said blade in a direction opposite to that of the rotation of said shaft.

2. A helical conveyer for scraping material from the inner surface of a tubular member, including a shaft, a helical blade encircling said shaft, and having its inner periphery spaced from said shaft to leave an annular passageway along said shaft, and spring arms fixed to said shaft and connected to said blade, whereby said blade resiliently yields circumferentially with respect to said shaft, and in a direction opposite to that of the rotation of said shaft.

3. A helical conveyer for scraping material from the inner surface of a tubular member, including a shaft, a helical blade encircling said shaft and having its inner periphery spaced from said shaft to leave an annular passageway along said shaft, said blade being formed of separate sections, means connecting said sections for rotation together, said means permitting relative lengthwise movement between said sections, and means for resiliently supporting said helical blade on said shaft.

4. A helical conveyer for advancing material along a tubular member, including a shaft, a pair of helical blade sections supported by said shaft, and means for connecting said sections lengthwise for rotation together, said means including a pair of plates fixed to the end of one blade section and extending beyond the end thereof in spaced relationship, the end of the other blade section being loosely disposed in the space between said plates, and normally spaced from the end of the other blade section fixed to said plates.

5. A helical conveyer for advancing material along a tubular member, including a shaft, a helical blade encircling said shaft, and having its inner periphery spaced from said shaft to leave an annular passageway along said shaft, and spring arms, each having one end thereof fixed to said shaft and curved near said latter end to partially encircle said shaft, and having the other end connected to said helical blade whereby said blade will be resiliently supported upon said shaft.

6. A helical conveyer for advancing material along a tubular member, including a shaft, a helical blade encircling said shaft, and having its inner periphery spaced from said shaft to leave an annular passageway along said shaft, and radially extending spring arms fixed to said shaft and having their radially outer ends connected to said blade, whereby said blade may resiliently yield circumferentially with respect to said shaft, and in a direction opposite to that of the rotation of said shaft.

7. A helical conveyer for advancing material along a tubular member, including a shaft, a pair of helical blades encircling said shaft and disposed at an angle of 180° apart, said blades having their inner peripheries spaced from said shaft to leave an annular passageway along said shaft, and spring arms each extending diametrically through said shaft, and having the radially outer ends thereof connected to diametrically opposite portions of the two opposed helical blades to resiliently connect both blades to said shaft.

8. An apparatus for chilling liquids to separate solids therefrom, including a pipe for the flow of liquid to be cooled, a shaft within the pipe, a flexible helical blade for scraping solid material collected on the inner surface of said pipe, said blade comprising a plurality of sections, lost motion connections between the ends of successive sections, and a plurality of arms axially spaced along said shaft for resiliently supporting each section on said shaft and permitting bending movement of said blade radially and circumferentially.

9. In combination with a tubular member, a shaft therein, a helical blade connected to said shaft, and means for supporting the intermediate portion of said shaft, and including a bearing member fixed to said shaft, and having spaced arms, anti-friction rolling elements at the radially outer ends of said arms, and engaging the inner surface of said tubular member, and means on each arm for scraping solids from said surface in advance of each of said elements.

10. In combination with a tubular member, a helical scraper in said tubular member, and including a shaft, a helical blade connected to said shaft, and means for supporting the intermediate portion of said shaft, and including a bearing member having a sleeve portion encircling said shaft and fixed thereto, a plurality of radially extending arms, and anti-friction rolling elements at the radially outer ends of said arms, and engaging the inner surface of said tubular member, said supporting means and said shaft being axially removable through said tubular member.

11. In combination with a tubular member, a helical conveyer in said tubular member for advancing material therealong, and including a shaft, a helical blade connected to said shaft, and means for supporting the intermediate portion of said shaft, and including a bearing member having a sleeve portion encircling said shaft and fixed thereto, a plurality of radially extending arms, and anti-friction rolling elements at the radially outer ends of said arms, and engaging the inner surface of said tubular member, each of said arms at its radially outer end being provided with a scraping edge in contact with the inner surface of said tubular member for scraping solids from said inner surface.

12. An apparatus for chilling liquids to separate solids therefrom, including a conduit for the flow of the liquid to be chilled, and a rotor within said conduit, said rotor including a shaft, a bearing member fixed to said shaft intermediate of the ends of said conduit and having spaced arms for supporting the shaft, anti-friction rolling elements at the radially outer ends of said arms and engaging the inner surface of said conduit, and means rotatable with said shaft for scraping solids from said surface along substantially the entire length of said conduit and from the portion of said surface in advance of said rolling elements.

NICOLAI H. HILLER.
EDWARD B. McCABE.